(12) United States Patent
Asada et al.

(10) Patent No.: US 6,659,658 B2
(45) Date of Patent: Dec. 9, 2003

(54) OPTICAL CONNECTOR DEVICE AND OPTICAL CONNECTOR

(75) Inventors: Kazuhiro Asada, Nagoya (JP); Hitoshi Imazu, Nagoya (JP); Yuji Nakura, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

(*) Notice: Subject to any disclaimer, the term of this patent is extended or adjusted under 35 U.S.C. 154(b) by 55 days.

(21) Appl. No.: 10/101,734

(22) Filed: Mar. 21, 2002

(65) Prior Publication Data

US 2002/0136506 A1 Sep. 26, 2002

(30) Foreign Application Priority Data

Mar. 26, 2001 (JP) ........................................ 2001-087500

(51) Int. Cl.[7] ................................................. G02B 6/36
(52) U.S. Cl. .............................. 385/92; 385/88; 385/78; 385/60
(58) Field of Search ............................... 385/56, 59, 60, 385/74, 78, 88–94

(56) References Cited

U.S. PATENT DOCUMENTS 6,527,451 B2 * 3/2003 Asada ...................... 385/88 X
6,588,947 B2 * 7/2003 Mine et al. .................... 385/92

FOREIGN PATENT DOCUMENTS

JP          A 11-297427          10/1999

* cited by examiner

Primary Examiner—Phan T. H. Palmer
(74) Attorney, Agent, or Firm—Oliff & Berridge, PLC (57) ABSTRACT

In an optical connector device configured by a combination of an element-side optical connector 10 which accommodates an optical element D, and a fiber-side optical connector 30 which holds an optical fiber, an element accommodating housing member 11 of the optical connector 10, and a fiber holding housing member 31 of the optical connector 30 are formed by an electrically conductive resin. In a state where the optical connectors 10 and 30 are connected to each other, the fiber holding housing member 31 is electrically connected to the element accommodating housing member 11.

6 Claims, 6 Drawing Sheets

FIG. 8

OPTICAL CONNECTOR DEVICE AND OPTICAL CONNECTOR

BACKGROUND OF THE INVENTION

The present invention relates to an optical connector device and an optical connector which are useful in the field of optical communication for OA, FA, vehicle apparatuses, and the like.

In an optical connector of the related art, particularly, in an optical connector which is used in an electromagnetically severe environment such as in an automobile, a configuration is employed in which an optical element for photoelectric conversion is covered by a shield case and the shield case is then accommodated in a connector housing member. Electromagnetic noises or the like which may reach from the outside to the optical element are blocked by the shield case.

In the related optical connector, a coupling window for optically coupling the optical element in the shield case with a counter optical fiber is formed in the shield case. This causes a problem in that the optical element is susceptible to influence of noises due to electromagnetic waves passing through the window.

SUMMARY OF THE INVENTION

It is an object of the invention to provide an optical connector device and an optical connector which have excellent shielding performance for electromagnetic noises that may pass through a coupling portion between an optical fiber and an optical element.

In order to solve the problem, an optical connector device of a first aspect of the invention is an optical connector device in which the device comprises: an element-side optical connector having an element accommodating housing member in which an optical element is accommodated; and a fiber-side optical connector having a fiber holding housing member in which an optical fiber is held, and when the element-side optical connector and the fiber-side optical connector are connected to each other, a front end face of the optical fiber is opposed to a light receiving or emitting face of the optical element, wherein, in the fiber holding housing member, electrical conductivity is given at least to a portion which is capable to block electromagnetic waves that are to pass through a coupling portion between the optical fiber and the optical element in a state where the element-side optical connector and the fiber-side optical connector are connected to each other, and the conductivity-given portion is grounded via the element-side optical connector.

In a second aspect of the invention, a whole of at least one of the element accommodating housing member and the fiber holding housing member is formed by an electrically conductive resin.

In a third aspect of the invention, an electrically conductive plated layer is formed on an entire surface of at least one of the element accommodating housing member and the fiber holding housing member.

In a fourth aspect of the invention, the optical element is accommodated in the element accommodating housing member in a state where the optical element is accommodated in a metal shield case.

An optical connector of a fifth aspect of the invention is an optical connector having a fiber holding housing member in which an optical fiber is held, wherein in the fiber holding housing member, electrical conductivity is given at least to a region extending from a portion which is capable to block electromagnetic waves that are to pass through a coupling portion between the optical fiber and an optical element in a counter optical connector, to a portion which is in contact with a counter element accommodating housing member, in a state where the optical connector and the counter optical connector are connected to each other.

An optical connector of a sixth aspect of the invention is an optical connector having an element accommodating housing member in which an optical element is accommodated, wherein in the element accommodating housing member, electrical conductivity is given at least to a portion which is in contact with a housing member of a counter optical connector, and the conductivity-given portion is grounded.

BRIEF DESCRIPTION OF THE DRAWINGS

[FIG. 1]

[FIG. 2]

[FIG. 3]

[FIG. 4]

[FIG. 5]

[FIG. 6]

[FIG. 7]

[FIG. 8]

DETAILED DESCRIPTION OF THE PREFERRED EMBODIMENTS (First Embodiment)

Hereinafter, an optical connector device of a first embodiment of the invention will be described with reference to FIGS. 1 to 4.

Figure 1:
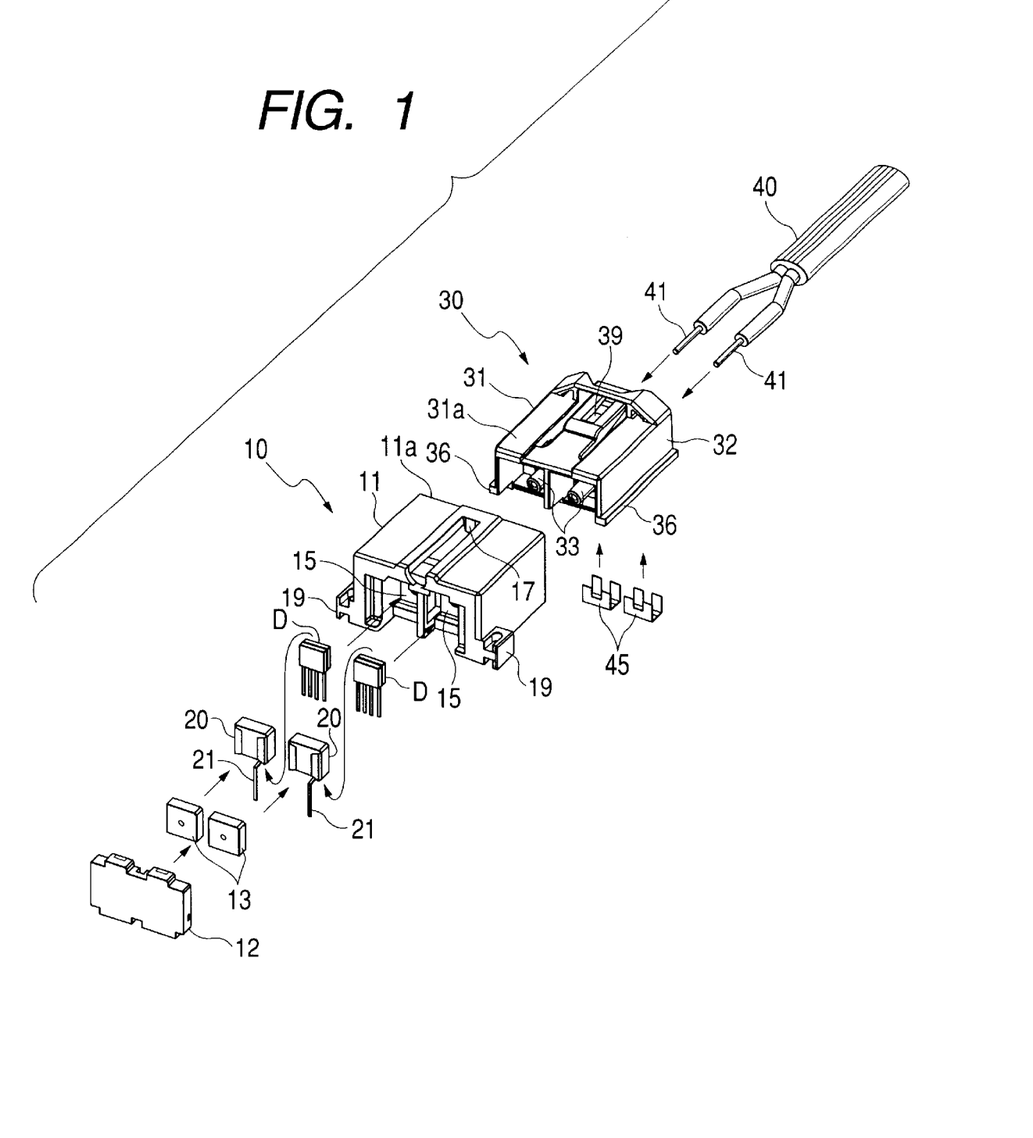
FIG. 1 is an exploded perspective view showing an optical connector device which is a first embodiment of the invention.

As shown in FIG. 1, the optical connector device is configured by a combination of an element-side optical connector 10 and a fiber-side optical connector 30. In the embodiment, the optical connector device will be described as a two-pole optical connector device. The embodiment may be similarly applied to a one-pole optical connector device or a multipolar optical connector device having three or more poles.

Figure 2:
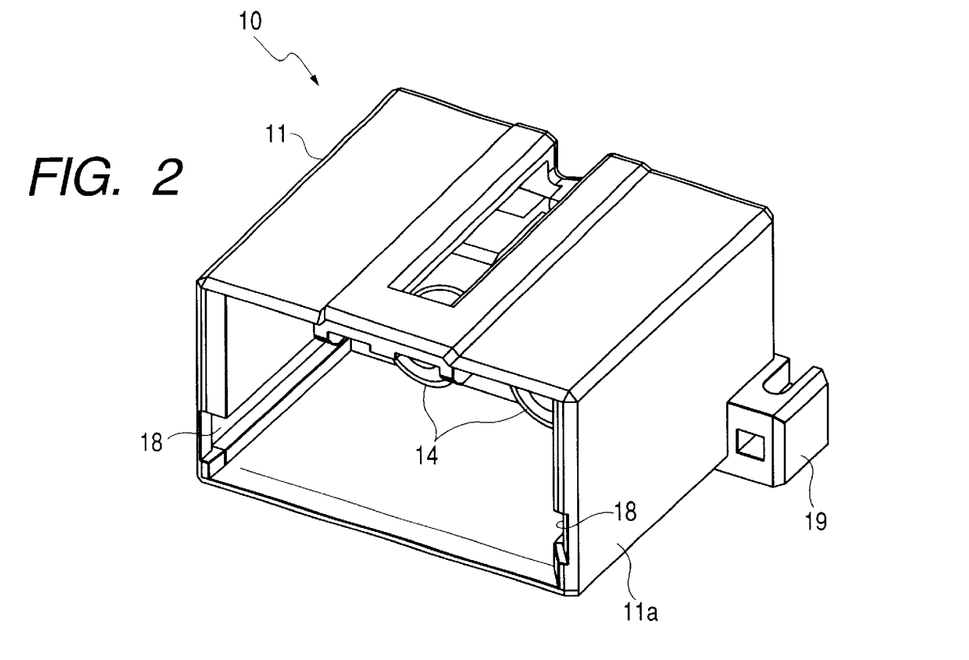
FIG. 2 is a perspective view showing an element-side optical connector of the optical connector device.
Figure 4:
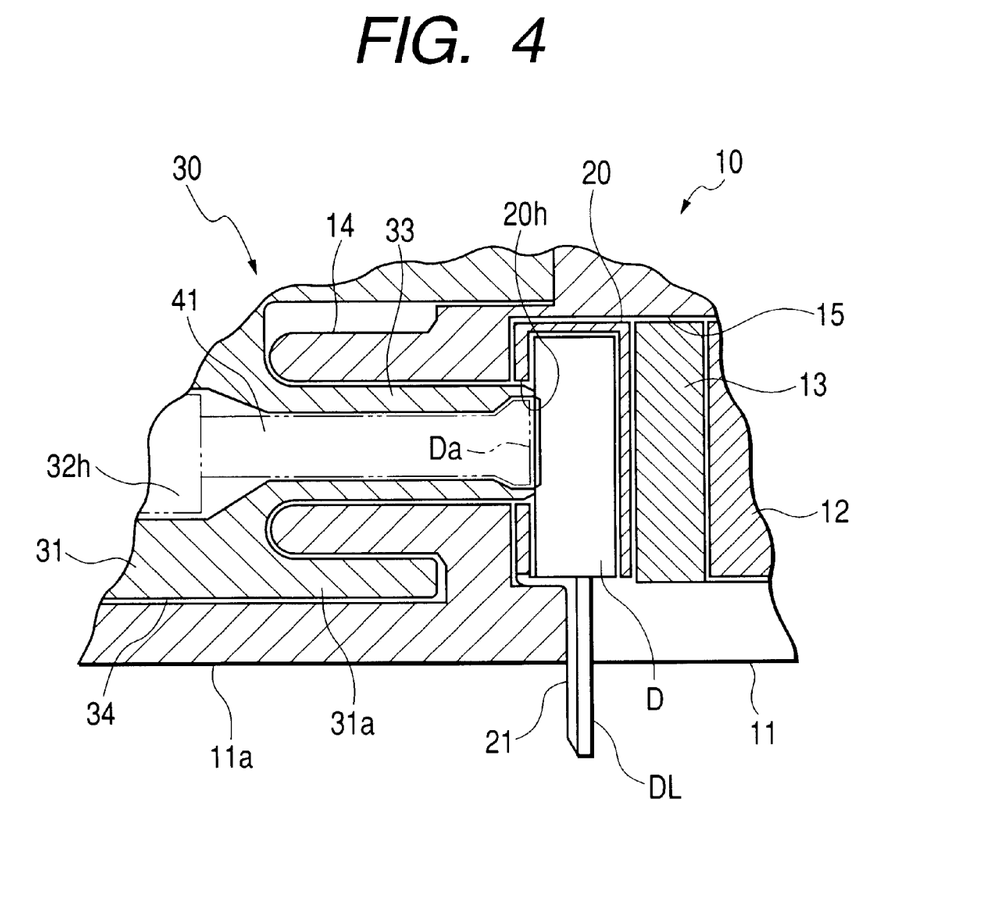
FIG. 4 is an enlarged section view of main portions of the optical connector device in a connected state.

As shown in FIGS. 1, 2, and 4, the element-side optical connector 10 has an element accommodating housing member 11 in which optical elements (light emitting elements or light receiving elements) D are accommodated. Each of the optical elements D is accommodated in the element accommodating housing member 11 in a state where the optical element is accommodated in a metal shield case 20.

Each of the shield cases 20 is formed by an electrically conductive material, and into a substantially box-like shape in which the bottom is opened. When the optical element D is inserted into the case through the bottom opening, the optical element D is accommodated in the shield case 20.

As the material forming the shield case 20, useful is a metal material such as brass, phosphor bronze, stainless steel, or nickel silver (German silver), an electrically conductive resin which contains an electrically conductive filler of carbon, or the like. When a metal material which is excellent in conductivity is used, electromagnetic waves emitted from the periphery of the optical element can be blocked more surely.

A coupling window 20h is formed in a front portion of each of the shield cases 20, and configured so that, in a state where the optical element D is accommodated and held in the shield case 20 as described above, an optical coupling portion (a light emitting face or a light receiving face) Da disposed in the front face of the optical element D faces the outside through the coupling window 20h.

A lead 21 which is electrically connected by soldering or the like to a grounding wiring pattern formed on a circuit board hangs from each of the shield cases 20.

In the element accommodating housing member 11, a pair of case accommodating recesses 15 which can respectively accommodate the shield cases 20 are formed inside a rear part of a substantially rectangular tubular external fitting portion 11a that is flat in the width direction.

Each of the case accommodating recesses 15 is formed into a recess-like shape which is opened in the back and bottom sides of the element accommodating housing member 11. The shield cases 20 can be accommodated at predetermined positions in the case accommodating recesses 15 through the back-side openings, respectively.

A lid member 12 is attached and fixed to the back side of the element accommodating housing member 11 by a predetermined engaging structure, an adhesive agent, or the like, so as to close the back openings of the case accommodating recesses 15. The lid member 12 pushes each of the shield cases 20 against the front face of the corresponding case accommodating recess 15 via a spacer member 13, whereby the shield cases 20 are held to the predetermined positions in the case accommodating recesses 15, respectively.

In this state, leads DL downward elongating from the optical elements D, and the leads 21 downward elongating from the shield cases 20 are extended below the element accommodating housing member 11 with passing through the bottom openings of the case accommodating recesses 15. When the optical connector 10 is fixed onto the circuit board, the leads will be electrically connected by soldering or the like to signal or grounding wiring patterns which are formed on the circuit board.

A cylindrical ferrule guide 14 is formed at a front portion of each of the case accommodating recess 15 in the tubular external fitting portion 11a. In the state where the shield cases 20 are respectively accommodated in the case accommodating recesses 15, the optical coupling portions Da of the optical elements D accommodated in the shield cases 20 face the interiors of the ferrule guides 14 through the coupling windows 20h, respectively.

Figure 3:
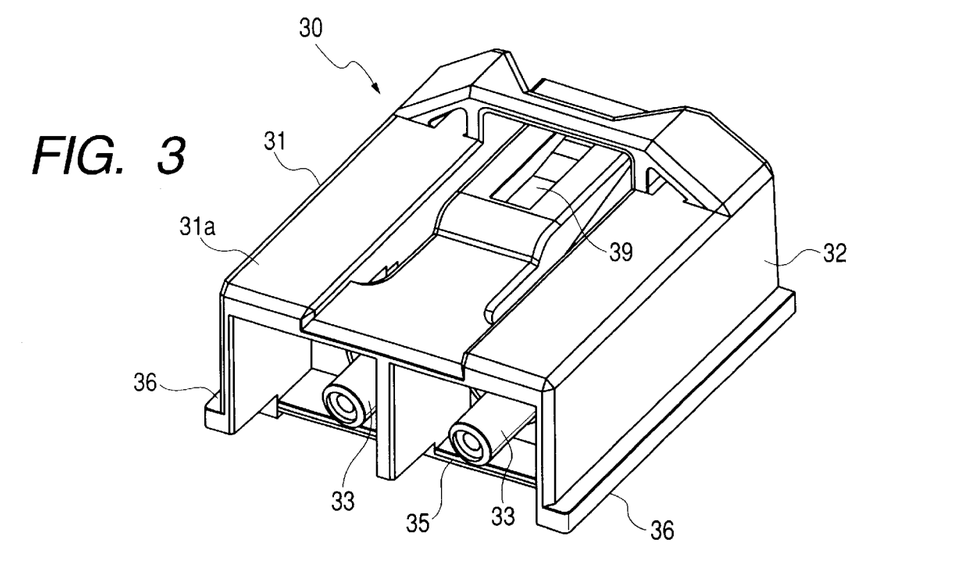
FIG. 3 is a perspective view showing a fiber-side optical connector of the optical connector device.

By contrast, as shown in FIGS. 1, 3, and 4, the fiber-side optical connector 30 has a fiber holding housing member 31 in which optical fibers 41 are held.

In the fiber holding housing member 31, fiber passing and holding portions 32 are formed inside a rear part of a substantially rectangular tubular internal fitting portion 31a that is flat in the width direction, and a pair of ferrules 33 are projected from the front ends of the fiber passing and holding portions 32 in the tubular internal fitting portion 31a. The pair of optical fibers 41 which are exposed by peeling off a sheath of an end portion of an optical fiber cord 40 are inserted into the ferrules 33 with being passed through holes 32h (only a part of the holes is shown in FIG. 4) in the fiber passing and holding portions 32, respectively. The optical fibers 41 are fixed and held to the fiber passing and holding portions 32 by using stoppers 45 and the like, and the front ends of the optical fibers 41 are mirror-polished at the front ends of the ferrules 33.

The element-side optical connector 10 and the fiber-side optical connector 30 are connected to each other in the following manner.

First, the tubular internal fitting portion 31a of the optical connector 30 is inserted into the tubular external fitting portion 11a of the optical connector 10 to be fitted thereinto, so that the ferrules 33 are inserted into the ferrule guides 14, respectively. When the tubular internal fitting portion is further inserted, the front end faces of the optical fibers 41 which are exposed from the front ends of the ferrules 33 are opposed to the optical coupling portions Da of the optical elements D which are placed in the inner sides of the ferrule guides 14, respectively. As a result, optical couplings between the optical fibers 41 and the optical elements D are realized (see FIG. 4). The connection state between the optical connectors 10 and 30 is held by disengageable engagement between an engaging portion 39 formed on the optical connector 30 and an engaged portion 17 formed on the optical connector 10.

In the embodiment, the whole element accommodating housing member 11 and the whole fiber holding housing member 31 are formed by an electrically conductive resin. As the electrically conductive resin, for example, a resin such as polybuthylene terephtalate (PBT) which contains an electrically conductive filler of carbon or the like can be used.

In order to attain more surely an electrical contact between the optical connectors 10 and 30 in the state where the element-side optical connector 10 and the fiber-side optical connector 30 are connected to each other, it is preferable that a skin layer containing only an insulative resin and not containing an electrically conductive filler is not formed on the surfaces of the element accommodating housing member 11 and the fiber holding housing member 31. For example, a resin which satisfies this requirement is an electrically conductive resin in which PBT (polybuthylene terephtalate) or ABS (acrylonitrile-butadiene-styrene copolymer) contains solder, Cu, or the like. When such a resin is used, the contact resistances between the element accommodating housing member 11 and the shield case 20, and the element accommodating housing member 11 and the fiber holding housing member 31 can be made 1 Ω or lower.

Alternatively, the element accommodating housing member 11 and the fiber holding housing member 31 may be configured by forming an electrically conductive plated layer configured by metal plating or the like on the entire surface of a resin molded product which is formed by an insulative resin or a conductive resin.

The element accommodating housing member 11 of the element-side optical connector 10 is grounded in the following manner.

Figure 8:
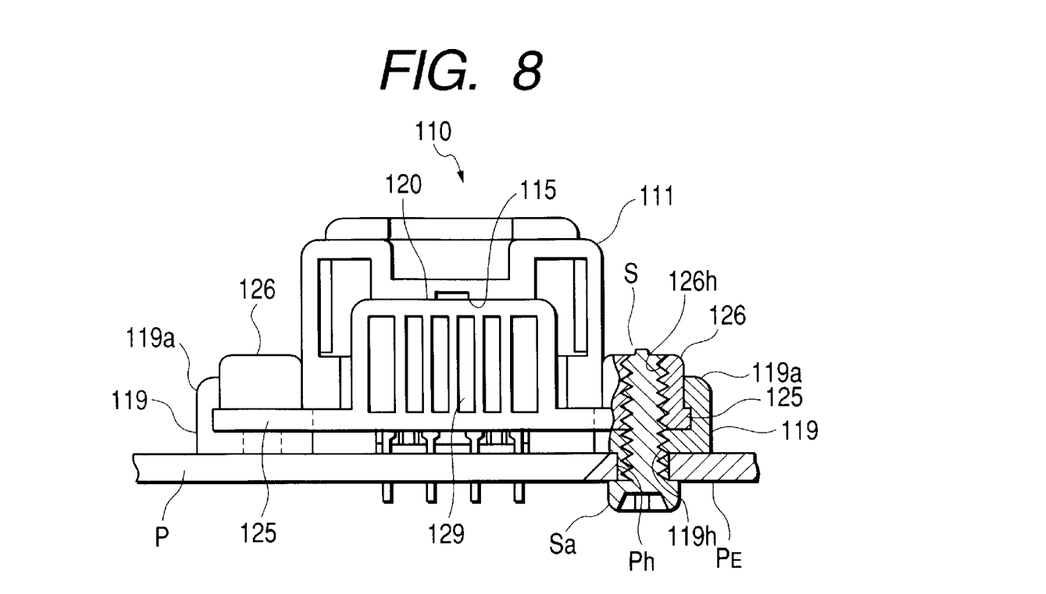
FIG. 8 is a partially cutaway rear view showing a state where the element-side optical connector of the optical connector device is attached to a circuit board.

A pair of fixing pieces 19 are formed on both the sides of the element accommodating housing member 11, respectively. In a state where the optical connector 10 is placed on a circuit board, screws are passed from the rear side of the circuit board through screw holes formed in the circuit board, and then screwed with the fixing pieces 19, respectively. At this time, the screws are made in contact with a grounding wiring pattern formed on the circuit board (see FIG. 8 showing a second embodiment) As a result, the element accommodating housing member 11 is grounded to the grounding wiring pattern through the screwing portions and the screws.

In the embodiment, since the shield cases 20 which are accommodated in the element accommodating housing member 11 are grounded through the leads 21, the element accommodating housing member 11 is grounded also through the shield cases 20. The device may have a configuration in which the fixing pieces 19 of the element accommodating housing member 11 are omitted and the member 11 is grounded only through the shield cases 20. Alternatively, the device may have a configuration in which the leads 21 of the shield cases 20 are omitted, and the element accommodating housing member 11 is grounded only through the fixing pieces 19. In the alternative, the shield cases 20 are grounded through the element accommodating housing member 11.

The configuration for grounding the element accommodating housing member 11 is not restricted to the configurations described above. For example, the element accommodating housing member 11 may be welded to a grounding wiring pattern formed on the circuit board.

When the optical connectors 10 and 30 are connected to each other, the fiber holding housing member 31 and the element accommodating housing member 11 enter the state where the members are electrically contacted with each other through the portion where the tubular internal fitting portion 31a is fitted into the tubular external fitting portion 11a, and the portions where the ferrules 33 are inserted into the ferrule guides 14, with the result that the fiber holding housing member 31 is grounded through the element accommodating housing member 11.

In the embodiment, the tubular internal fitting portion 31a of the fiber holding housing member 31 is extended more forward than the front ends of the ferrules 33 in the state where the portion encloses the ferrules 33, and the end faces of the optical fibers 41 in the front ends of the ferrules 33 are protected by the tubular internal fitting portion 31a.

In the tubular internal fitting portion 31a, a cutaway 35 is formed in the whole of the lower face, so that the work of mirror-polishing the optical fibers 41 can be easily conducted in the front ends of the ferrules 33 inside the tubular internal fitting portion 31a.

A thin ridge 36 which is outward projected is formed along the lower edge of the outer face of each of the side faces of the tubular internal fitting portion 31a (the lower edge elongates in the direction of insertion of the optical connector 30 into the optical connector 10). A positioning guide recess 18 which has a thin groove-like shape, and in which the corresponding ridge 36 can be slidably passed along the direction of connecting the optical connector 30 is formed in the inner face of each of the side faces of the tubular external fitting portion 11a of the element accommodating housing member 11. When the fiber-side optical connector 30 is inserted into and connected to the element-side optical connector 10, the ridges 36 are slidably inserted into the respective positioning guide recesses 18, thereby enabling insertion guidance of the optical connector 30 with respect to the optical connector 10 to be conducted. The ridges 36 and the positioning guide recesses 18 have functions of preventing erroneous insertion of the optical connectors 10 and 30, such as inverted insertion from occurring, and preventing the optical connectors 10 and 30 from rattling after insertion. They have a further function of ensuring the electrical contact between the housing members 11 and 31 in the state where the optical connectors 10 and 30 are connected to each other.

In the thus configured optical connector device, the fiber holding housing member 31 to which electrical conductivity is given is placed in front of the coupling portions (20h) between the optical coupling portions Da of the optical elements D and the optical fibers 41, and the fiber holding housing member 31 is allowed by the connection of the optical connectors 10 and 30 to be grounded through the element accommodating housing member 11. Therefore, the optical connector device has excellent shielding performance for electromagnetic noises which may pass through the coupling portion between the optical fiber 41 and the optical element D.

Since it is requested only to connect the optical connector 10 to the optical connector 30, the structure can be simplified.

When the element accommodating housing member 11 and the fiber holding housing member 31 are formed by an electrically conductive resin, particularly, the members can be easily produced.

In the embodiment, since the whole of the optical connector 10 is formed by an electrically conductive resin or an electrically conductive plated layer is formed on the entire surface of the optical connector, the optical elements D are doubly shielded by the shield case 20 and the element accommodating housing member 11. Therefore, the embodiment has excellent shielding performance for noises.

(Second Embodiment)

Hereinafter, an optical connector device of the second embodiment of the invention will be described with reference to FIGS. 5 to 8.

The optical connector device is configured by a combination of an element-side optical connector 110 and a fiber-side optical connector 130. In the embodiment, the optical connector device will be described as a one-pole optical connector device. The embodiment may be similarly applied to a multipolar optical connector device having two or more poles.

As shown in FIGS. 5 to 8, the element-side optical connector 110 is configured by a combination of an element accommodating housing member 111 and a shield case 120.

Figure 5:
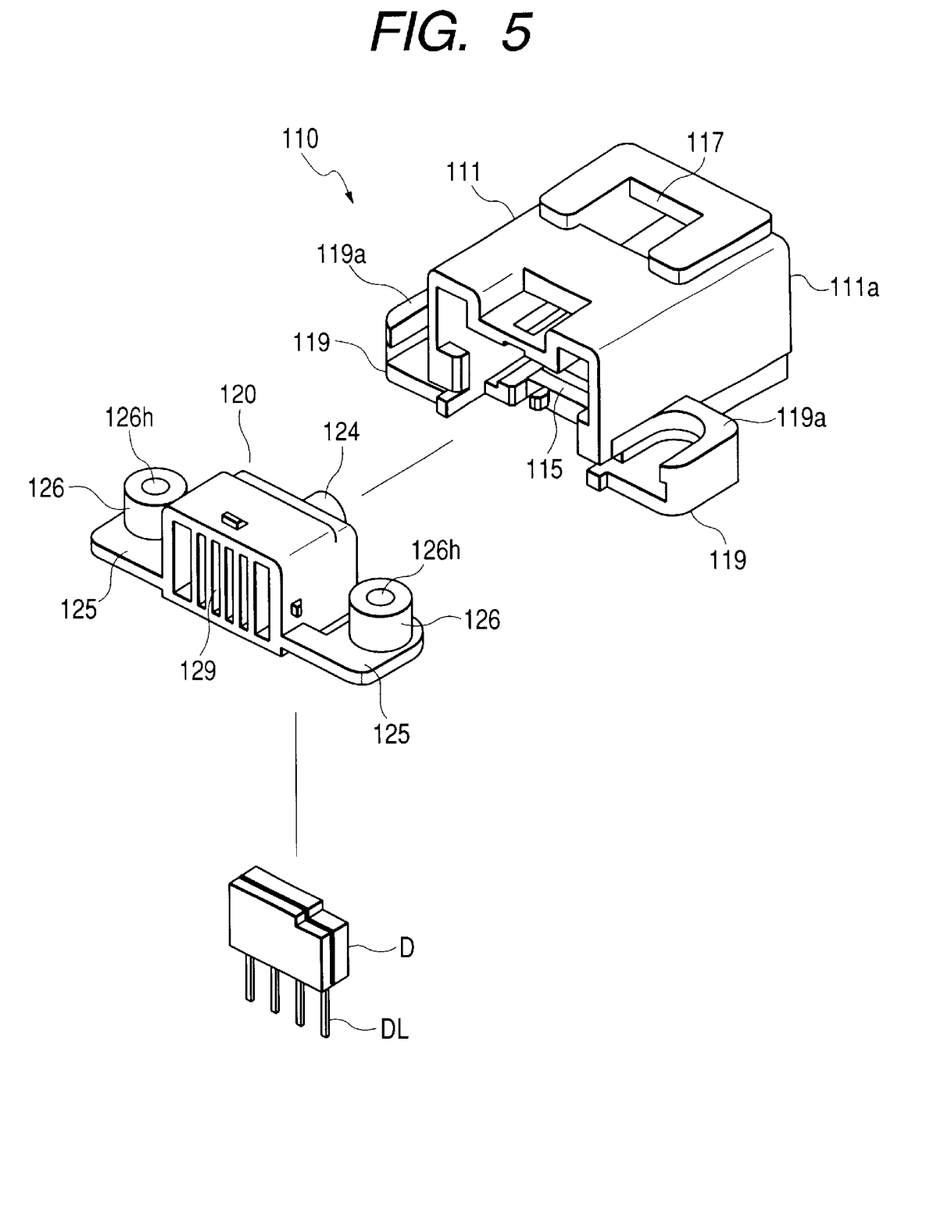
FIG. 5 is an exploded perspective view showing an element-side optical connector of an optical connector device which is a second embodiment of the invention.

The shield case 120 is formed by an electrically conductive material, and into a substantially box-like shape in which the bottom is opened. When the optical element D is inserted into the shield case 120 through the bottom opening, the optical element D is accommodated in the shield case. As the material forming the shield case 120, useful is a metal material such as brass, phosphor bronze, stainless steel, or nickel silver (German silver), an electrically conductive resin which contains an electrically conductive filler of carbon, or the like. When a metal material which is excellent in conductivity is used, electromagnetic waves emitted from the periphery of the optical element can be blocked more surely.

A cylindrical ferrule guide 124 is formed at a front portion of the shield case 120 so as to be positioned in front of the optical coupling portion Da of the optical element D accommodated in the shield case. When the optical element D is accommodated in the shield case 120, the optical coupling portion of the optical element D faces the interior of the ferrule guide 124.

A pair of fixing plates 125 which are outward projected are formed on both the sides of the shield case 120, respectively. A columnar grounding portion 126 having a screw hole 126h is formed on each of the fixing plates 125. The fixing plates 125 are placed respectively on fixing pieces 119 of the element accommodating housing member 111 which will be described later, and then screwed and fixed to a circuit board P (see FIG. 8).

A heat sink 129 (in the embodiment, a fin-like heat sink) is formed on the back side of the shield case 120.

Figure 6:
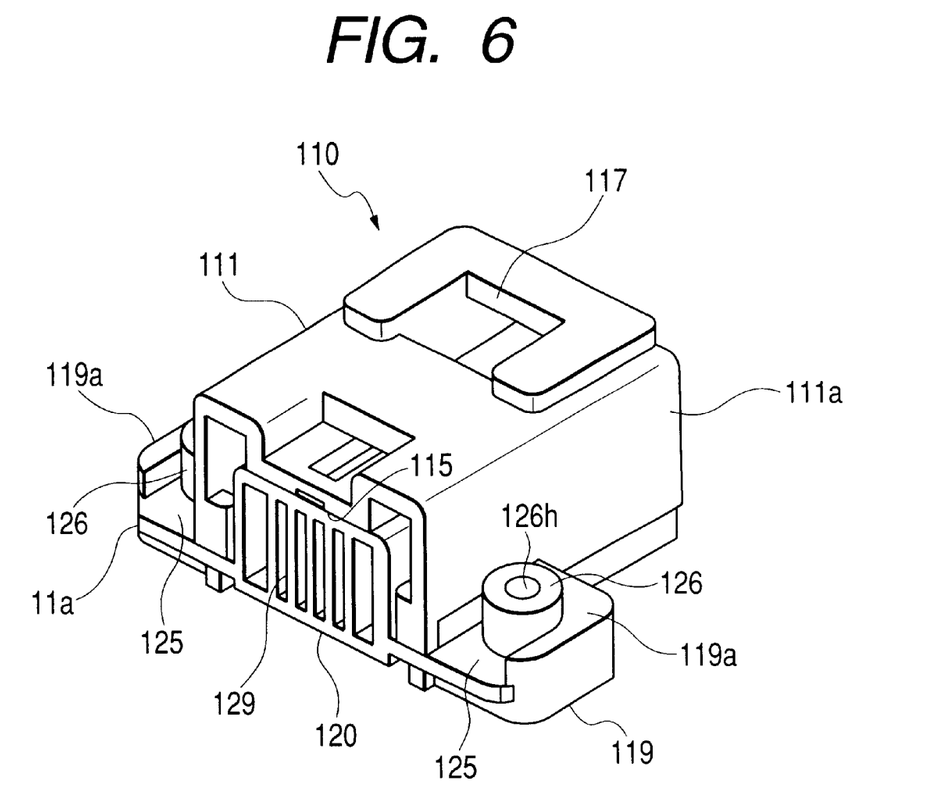
FIG. 6 is a perspective view showing an element-side optical connector of the optical connector device.

In the same manner as the element accommodating housing member 11 in the first embodiment described above, the element accommodating housing member 111 is formed by an electrically conductive resin, and a case accommodating recess 115 which can accommodate the shield case 120 is formed inside a rear part of a substantially rectangular tubular external fitting portion 111a.

The case accommodating recess 115 is formed into a recess-like shape which is opened in the back and bottom sides of the element accommodating housing member 111. The shield case 120 can be accommodated at a predetermined position in the case accommodating recess 115 through the back-side opening.

The pair of fixing pieces 119 having a through hole 119h are formed on both the sides of the element accommodating housing member 111, so as to overlap with the grounding portions 126, respectively. In each of the fixing pieces 119, a receiving portion 119a for the fixing plate 125 and the grounding portion 126 is formed.

When the shield case 120 is accommodated in the case accommodating recess 115 through the back-side opening of the element accommodating housing member 111, the fixing plates 125 and the grounding portions 126 are received by the receiving portions 119a, and the fixing plates 125 and the fixing pieces 119 are overlappingly placed. In the state where the optical connector 110 is placed on the circuit board P, as shown in FIG. 8, a screw S formed by an electrically conductive material such as a metal is inserted from the lower side of the circuit board P into a screw hole Ph formed in the circuit board P, and the through hole 119h, and then screwed with the screw hole 126h, whereby the optical connector 110 is fixed to the circuit board P. At this time, the screw head Sa of the screw S is made in contact with a grounding wiring pattern PE formed on the rear face of the circuit board P, so that the element accommodating housing member 111 is grounded to the wiring pattern PE through the fixing piece 119 and the screw S, and the shield case 120 is grounded to the wiring pattern PE through the fixing plate 125 and the screw S. Alternatively, the shield case 120 may be directly soldered to the grounding wiring pattern on the circuit board P so as to be grounded.

In the state where the shield case 120 is accommodated in the case accommodating recess 115 as described above, the ferrule guide 124 is projected into the tubular external fitting portion 111a through a hole of a partition wall which is formed in the element accommodating housing member 111.

Figure 7:
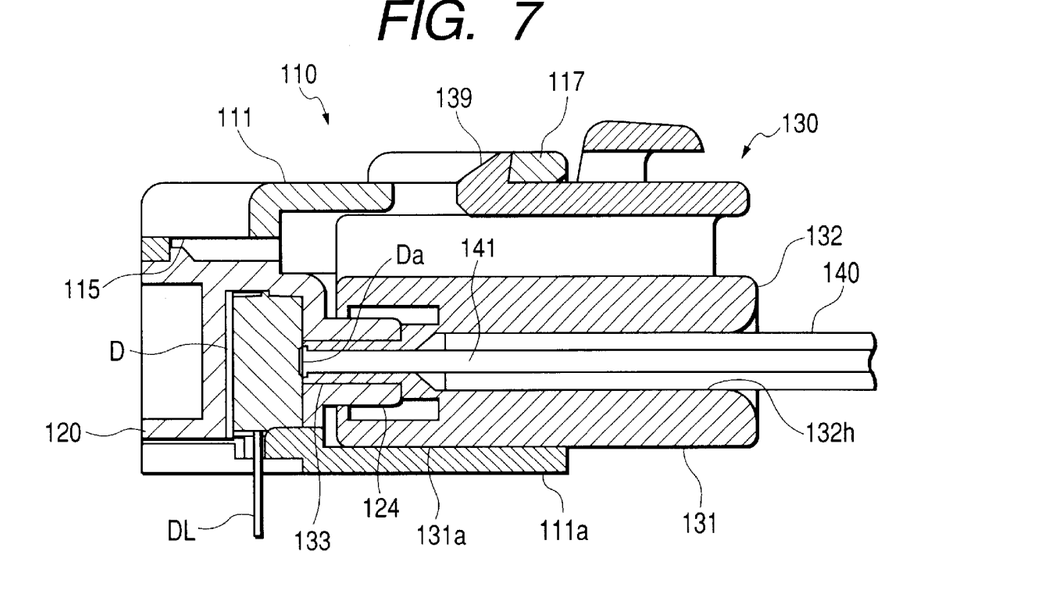
FIG. 7 is a section view showing a connected state of the optical connector device.

Leads DL of the optical element D downward elongate below the element accommodating housing member 111 through the bottom opening of the shield case 120 and the bottom opening of the case accommodating recess 115. In the state where the optical connector 110 is fixed onto the circuit board P, the leads are adequately electrically connected by soldering or the like to wiring patterns formed on the circuit board P.

The heat sink 129 is exposed from the back opening of the element accommodating housing member 111. The device is configured so that heat generated by the optical element D is transmitted to the shield case 120 to be dissipated to the outside from the heat sink 129.

As shown in FIG. 7, the fiber-side optical connector 130 has a fiber holding housing member 131 in which an optical fiber 141 is held.

In the same manner as the fiber holding housing member 31 in the first embodiment described above, the fiber holding housing member 131 is formed by an electrically conductive resin. A fiber passing and holding portion 132 is formed inside a rear part of a substantially rectangular tubular internal fitting portion 131a, and a ferrule 133 is projected from the front end of the fiber passing and holding portion 132 in the tubular internal fitting portion 131a. The optical fiber 141 which is exposed by peeling off a sheath of an end portion of an optical fiber cord 140 is inserted into the ferrule 133 with being passed through a hole 132h in the fiber passing and holding portion 132. The optical fiber 141 is fixed and held to the fiber passing and holding portion 132 by an adhesive agent or the like, and the front end of the optical fiber 141 is mirror-polished at the front end of the ferrule 133.

The element-side optical connector 110 and the fiber-side optical connector 130 are connected to each other in the following manner.

First, the tubular internal fitting portion 131a of the optical connector 130 is inserted into the tubular external fitting portion 111a of the optical connector 110 to be fitted thereinto, so that the ferrule 133 is inserted into the ferrule guide 124. When the tubular internal fitting portion is further inserted, the front end face of the optical fiber 141 which is exposed from the front end of the ferrule 133 is opposed to the optical coupling portion Da of the optical element D which is placed in the inner side of the ferrule guide 124. As a result, optical coupling between the optical fiber 141 and the optical element D is realized (see FIG. 7). The connection state between the optical connectors 110 and 130 is held by disengageable engagement between an engaging portion 139 formed on the optical connector 130 and an engaged portion 117 formed on the optical connector 110.

In the optical connector device also, when the optical connectors 110 and 130 are connected to each other, the optical connector 130 is placed in front of the optical coupling portions Da of the optical elements D, and the tubular internal fitting portion 131a of the fiber holding housing member 131 is fitted into the tubular external fitting portion 111a of the element accommodating housing member 111, so that the fiber holding housing member 131 is grounded via the element accommodating housing member 111. Therefore, the optical connector device attains the same effects as the optical connector in the first embodiment, such as that the device has excellent shielding performance for electromagnetic noises which may pass through the coupling portion between the optical fiber 141 and the optical element D.

Alternatively, the element accommodating housing member 111 and the fiber holding housing member 131 may be configured by forming an electrically conductive plated layer configured by metal plating or the like on the entire surface of a resin molded product which is formed by an insulative resin or a conductive resin.

Since the whole of the optical connector. 110 is formed by an electrically conductive resin or an electrically conductive plated layer is formed on the entire surface of the optical connector, the optical element D is doubly shielded by the shield case 120 and the element accommodating housing member 111. Therefore, the embodiment has excellent shielding performance for noises.

(Modifications)

In the first and second embodiments, electrical conductivity is given to the whole of or the entire surface of the element accommodating housing member 11 or 111 and the fiber holding housing member 31 or 131. It is not always required to configure the device in this way.

The device is requested only to be configured so that, in the fiber holding housing member 31 or 131, electrical conductivity is given at least to a portion which is able to block electromagnetic waves that are to pass through the coupling portion between the optical fiber 41 or 141 and the optical element D in the state where the optical connector 10 or 110 and the optical connector 30 or 130 are connected to each other, and the conductivity-given portion is grounded via the element accommodating housing member 11 or 111 by the connection between the optical connector 10 or 110 and the optical connector 30 or 130.

In the fiber holding housing member 31 of the first embodiment, for example, it is requested only that electrical conductivity is given at least to the region extending from the portion (such as the ferrules 33 and the tubular internal fitting portion 31a) which is able to block electromagnetic waves that are to pass through the coupling windows 20h serving as the coupling portion between the optical fibers 41 and the optical elements D, to the portion (the outer surfaces of the ferrules 33 and the outer surface of the tubular internal fitting portion 31a) which is in contact with the counter element accommodating housing member 11, in the state where the optical connectors 10 and 30 are connected to each other. In the element accommodating housing member 11, it is requested only that electrical conductivity is given at least to the region extending from the portion (the inner surfaces of the ferrule guides 14 and the inner surface of the tubular external fitting portion 11a) to the grounded portion in the state where the optical connectors 10 and 30 are connected to each other.

More specifically, in the fiber holding housing member 31, for example, only the tubular internal fitting portion 31a which is placed in front of the coupling windows 20h in the state where the optical connectors 10 and 30 are connected to each other may be formed by a conductive resin, or an electrically conductive plated layer may be formed only on the outer surface of the portion. In the element accommodating housing member 11, the region extending from the portion of the tubular external fitting portion 11a including the surface to the portion to be grounded (such as the fixing pieces 19) may be formed by a conductive resin, or an electrically conductive plated layer may be formed on the surface of the region.

As described above, in the optical connector device according to the first to fourth aspects of the invention, electrical conductivity is given at least to a portion which is able to block electromagnetic waves that are to pass through a coupling portion between an optical fiber and an optical element, in a state where the element-side optical connector and the fiber-side optical connector are connected to each other, and the conductivity-given portion is grounded via the element-side optical connector.

Therefore, the device has excellent shielding performance for electromagnetic noises that may pass through the coupling portion between the optical fiber and the optical element.

In the optical connector device according to the second aspect of the invention, the element accommodating housing member or the fiber holding housing member can be easily produced by using an electrically conductive resin.

In the optical connector device according to the fourth aspect of the invention, since the optical element is accommodated in the element accommodating housing member in the state where the optical element is accommodated in the metal shield case, electromagnetic waves emitted from the periphery of the optical element can be blocked more surely.

In the optical connector according to the fifth aspect of the invention, electrical conductivity is given at least to a region of the fiber holding housing member extending from a portion which is able to block electromagnetic waves that are to pass through a coupling portion between an optical fiber and an optical element in a counter optical connector, to a portion which is in contact with a counter element accommodating housing member, in a state where the optical connector and the counter optical connector are connected to each other. Therefore, the connector has excellent shielding performance for electromagnetic noises that may pass through the coupling portion between the optical fiber and the optical element.

In the optical connector according to the sixth aspect of the invention, when connected to an optical connector such as described above on the side of an optical fiber, the conductivity-given portion of the fiber-side optical connector is grounded, whereby shielding performance for electromagnetic noises that may pass through the coupling portion between the optical fiber and the optical element can be improved.

What is claimed is:

1. An optical connector device comprising:

an element-side optical connector having an element accommodating housing member in which an optical element is accommodated; and a fiber-side optical connector having a fiber holding housing member in which an optical fiber is held, wherein when said element-side optical connector and said fiber-side optical connector are connected to each other, a front end face of said optical fiber is opposed to a light receiving or emitting face of said optical element, in said fiber holding housing member, electrical conductivity is given at least to a portion which is capable to block electromagnetic waves that pass through a coupling portion between said optical fiber and said optical element in a state where said element-side optical connector and said fiber-side optical connector are connected to each other, and said conductivity-given portion is grounded via said element-side optical connector.

2. The optical connector device according to claim 1, wherein a whole of at least one of said element accommodating housing member and said fiber holding housing member is formed by an electrically conductive resin.

3. The optical connector device according to claim 1, wherein an electrically conductive plated layer is formed on an entire surface of at least one of said element accommodating housing member and said fiber holding housing member.

4. The optical connector device according to claim 1, wherein said optical element is accommodated in said element accommodating housing member in a state where said optical element is accommodated in a metal shield case.

5. An optical connector comprising:

a fiber holding housing member in which an optical fiber is held, and a portion which is connected to a counter optical connector, wherein
   in said fiber holding housing member, electrical conductivity is given at least to a region extending from a portion which is capable to block electromagnetic waves that pass through a coupling portion between an optical element in said counter optical connector and said optical fiber, and to said portion which is in contact with a counter element accommodating housing member, in a state where said optical connector and said counter optical connector are connected to each other.

6. An optical connector comprising:
an element accommodating housing member in which an optical element is accommodated, and
a portion which is connected to a counter optical connector, wherein
   in said element accommodating housing member, electrical conductivity is given at least to said portion which is in contact with a housing member of said counter optical connector, and
   said conductivity-given portion is grounded.

* * * * *